United States Patent

[11] 3,583,655

| [72] | Inventor | Robert J. Roman<br>Rochester, N.Y. |
|---|---|---|
| [21] | Appl. No. | 777,281 |
| [22] | Filed | Nov. 20, 1968 |
| [45] | Patented | June 8, 1971 |
| [73] | Assignee | Eastman Kodak Company<br>Rochester, N.Y.<br>Continuation of application Ser. No.<br>692,815, Dec. 22, 1967, now abandoned. |

[54] CARTRIDGE-LOADED PROJECTOR OR THE LIKE
8 Claims, 9 Drawing Figs.

[52] U.S. Cl. ............................................. 242/197,
352/72
[51] Int. Cl. ........................................... G03b 1/04,
G11b 15/32, G11b 23/04
[50] Field of Search .......................................... 242/197,
205; 352/72, 78

[56] References Cited
UNITED STATES PATENTS

| 2,135,026 | 11/1938 | Becker | 242/205 |
| 2,256,899 | 9/1941 | Greenwood | 242/206 |
| 3,275,253 | 9/1966 | Cherniavskyj | 242/197X |

Primary Examiner—Leonard D. Christian
Attorneys—Robert W. Hampton and J. Addison Mathews ABSTRACT: A motion picture projector provided with means for supporting film supply cartridges of different sizes with the rotational axes of their film supply reels at respective different predetermined positions includes a supply reel support spindle carried by an arm which is angularly adjustable about an axis parallel to the spindle to selectively position the spindle at different ones of such predetermined positions of the reel axes. Preferably, the spindle may be positioned at locations which do not necessarily lie on an arc of a circle thereby allowing for interchangeable cartridges containing reels whose axes do not define the arc of a circle in their respective positions on the projector.

ROBERT J. ROMAN
INVENTOR.
ATTORNEYS

ROBERT J. ROMAN
INVENTOR.

ATTORNEYS

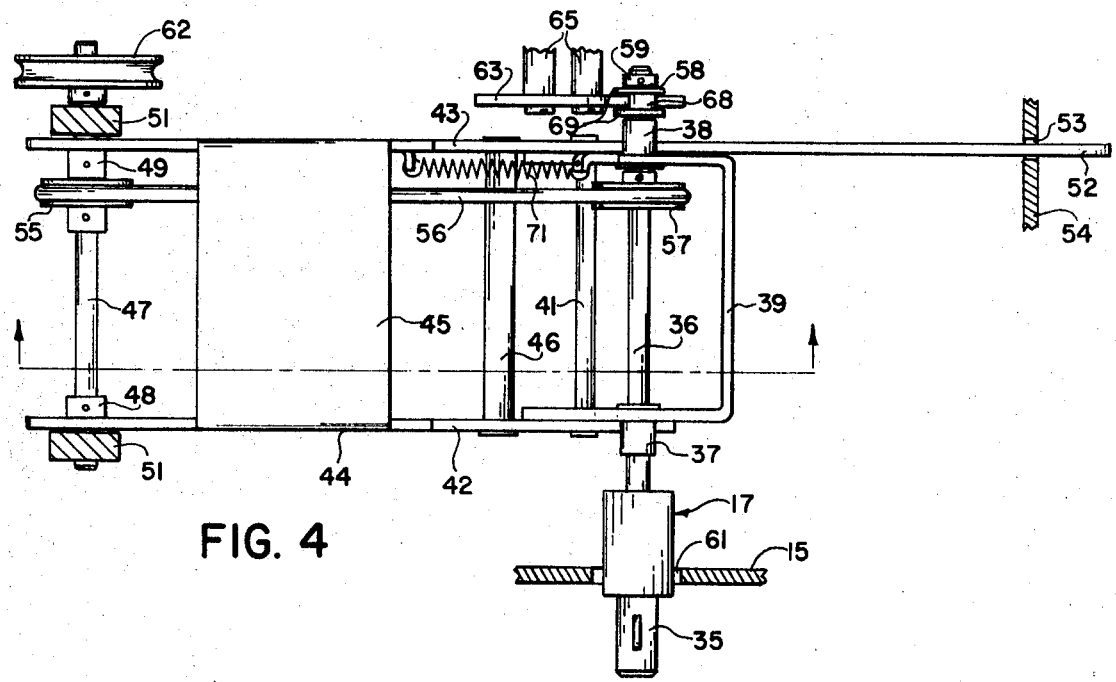
FIG. 4
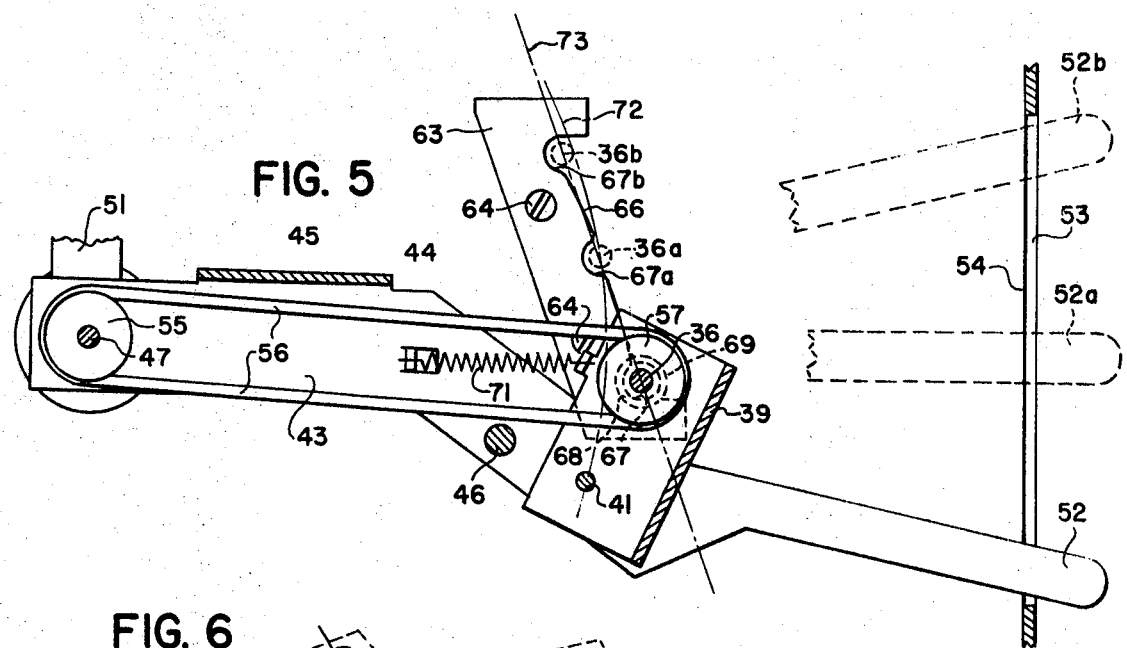
FIG. 5
FIG. 6
ROBERT J. ROMAN
INVENTOR.
BY J. Addison Matthews
Robert W Hampton
ATTORNEYS

PATENTED JUN 8 1971 3,583,655

ROBERT J. ROMAN
INVENTOR.

BY J. Adding Mathews

Robert W Hampton

ATTORNEYS

CARTRIDGE-LOADED PROJECTOR OR THE LIKE

The present invention is a continuation of commonly assigned copending U.S. Pat. application Ser. No. 692,815 entitled CARTRIDGE AND REEL SUPPORTING MEANS FOR CARTRIDGE-LOADING MOTION PICTURE PROJECTOR, filed in the name of Robert J. Roman on Dec. 22, 1967 and now abandoned.

REFERENCE TO RELATED APPLICATIONS

Reference is made also to commonly assigned copending U.S. Pat. applications Ser. No. 470,499 entitled AUTOMATIC FILM STRIPPER, filed in the name of Edward S. McKee on July 8, 1965; Ser. No. 643,503 entitled CARTRIDGE FOR REEL OF STRIP MATERIAL, filed in the names of John J. Bundschuh and Kenneth W. Thompson on June 5, 1967; Ser. No. 736,524 entitled CARTRIDGE, filed in the name of John J. Bundschuh on Nov. 24, 1967; Ser. No. 685,616 entitled CINEMATOGRAPHIC PROJECTORS OR THE LIKE AND CARTRIDGES FOR USE THEREWITH, filed in the names of John J. Bundschuh et al. on Nov. 24, 1967; and Ser. No. 731,562 entitled CARTRIDGE AND MEANS FOR LOCATING A CARTRIDGE ON A PROJECTOR OR THE LIKE, filed in the name of John J. Bundschuh on May 23, 1968.

BACKGROUND OF THE INVENTION

1. Field of the Invention

The present invention relates to self-threading cartridge-loaded motion picture projectors and related equipment and more particularly to such equipment adapted to accommodate film cartridges of different film capacities.

2. Description of the Prior Art

To simplify the use of motion picture projectors or the like, considerable attention has been directed toward providing means whereby such an apparatus can be loaded with a cartridge containing a film reel from which the film automatically can be removed, threaded, projected, and then rewound into the cartridge.

A representative example of such a cartridge-loading projector system is disclosed in commonly assigned copending U.S. Pat. application Ser. No. 685,616, entitled CINEMATOGRAPHIC PROJECTORS OR THE LIKE AND CARTRIDGES FOR USE THEREWITH, filed in the names of John J. Bundschuh et al. on Nov. 24, 1967. In the system disclosed in that application, a film reel is positioned within a cartridge having an opening adapted to receive a spindle which rotatably supports and drives the reel within the cartridge. With the cartridge positioned on the projector, the film roll is radially accessible to a stripping mechanism movable into temporary operative relationship with the film roll on the reel through another cartridge opening; such mechanism being adapted to separate the leading end of the film from the roll and to feed it along or toward a predetermined threading path. Upon completion of the projection cycle, a rewind mechanism initiates a rewind cycle, whereupon the gate is opened, the pulldown claw is retracted, and the film is rapidly rewound onto the supply reel. Further details and features of the aforementioned film-stripping and -threading mechanism and of film supply cartridges adapted for use therewith are disclosed in related U.S. Pat. application Ser. No. 643,502 entitled CINEMATOGRAPHIC CARTRIDGE PROJECTOR APPARATUS, filed in the names of John J. Bundschuh et al. on June 5, 1967; U.S. Pat. application Ser. No. 470,499 entitled AUTOMATIC FILM STRIPPER, filed in the name of Edward S. McKee on July 8, 1965; U.S. Pat. application Ser. No. 643,503 entitled CARTRIDGE FOR REEL OF STRIP MATERIAL, filed in the name of John J. Bundschuh et al. on June 5, 1967; and U.S. Pat. application Ser. No. 736,524 entitled CARTRIDGE, filed in the name of John J. Bundschuh on Nov. 24, 1967.

In order that film supply reels of different capacities can be loaded onto the subject type of projector, similar film supply cartridges of different sizes can be provided with substantially identical locating and supporting surfaces as disclosed in commonly assigned U.S. Pat. application Ser. No. 731,562 entitled CARTRIDGE AND MEANS FOR LOCATING A CARTRIDGE ON A PROJECTOR OR THE LIKE, filed in the name of John J. Bundschuh on May 23, 1968.

To enable the stripping and threading mechanism to perform properly notwithstanding the substantial difference in diameters of the film rolls housed in such cartridges, the locating and supporting surfaces of the cartridges are adapted to cooperate with mating means on the projector to position the respective supply reels within the different sized cartridges at predetermined noncoaxial locations. Accordingly, means must be provided for locating the reel spindle, which rotatably supports the supply reel in a cartridge, at such different locations.

SUMMARY OF THE INVENTION

In accordance with the present invention, a cartridge-loaded motion picture projector is provided with a supply reel spindle carried on a support arm. The projector is adapted to be interchangeably loaded with film reels of different capacity contained in cartridges of corresponding capacity, and the support arm is pivotally mounted on the projector for adjustment to a selected one of a plurality of positions in coaxial alignment with the selected size of reel and cartridge on the projector. Preferably, locating and retaining means are provided to accurately position and hold the pivotal arm in its selected position, thereby eliminating further spindle adjustment as long as cartridges of that same capacity are employed. Additionally, the invention contemplates positioning of the spindle at locations which do not necessarily lie on an arc of a circle thereby allowing for interchangeable cartridges containing reels whose axes do not define the arc of a circle in their respective positions on the projector.

Various means for practicing the invention and other advantages and novel features thereof will be apparent from the following detailed description of an illustrative preferred embodiment of the invention, reference being made to the accompanying drawings in which like reference numerals refer to like elements.

BRIEF DESCRIPTION OF THE DRAWINGS

In the accompanying drawings:

FIG. 4 is a plan view of a preferred embodiment of the invention comprising a spindle support mechanism which is adjustable manually to locate the supply reel spindle at the different positions of the reel axes illustrated in FIG. 3;

FIG. 5 is a cross-sectional elevational view of the structure depicted in FIG. 5, taken along line 6–6 of that figure; and FIG. 6 is a view corresponding generally to FIG. 5 but depicting a simpler embodiment of the invention by which the film supply reel spindle is adjustable to different positions lying along an arc centered at the pivot axis of the spindle support arm;

DESCRIPTION OF THE ILLUSTRATIVE PREFERRED EMBODIMENT

Figure 1:
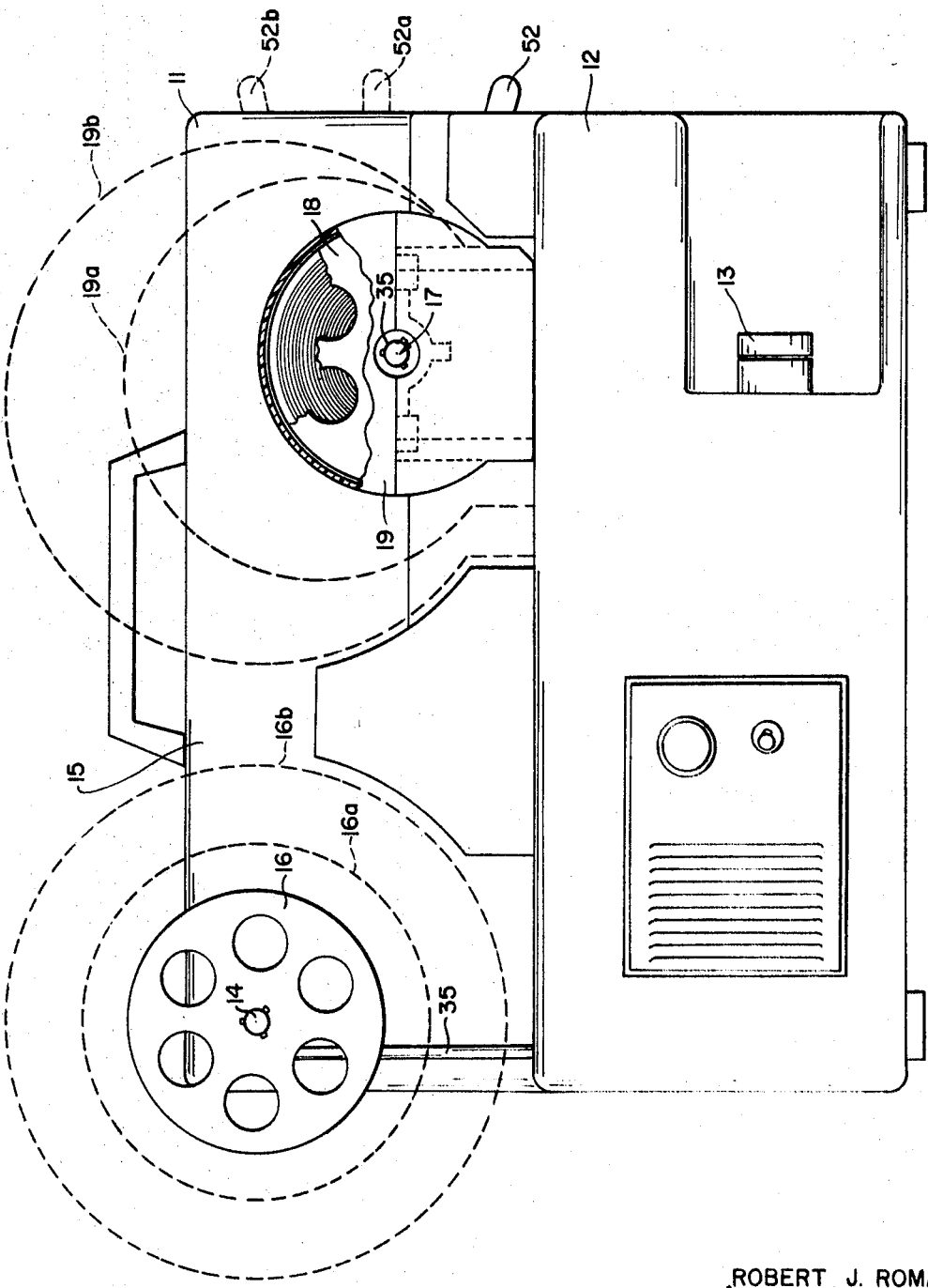
FIG. 1 is a side elevational view of a self-threading cartridge-loaded motion picture projector in accordance with the present invention illustrating different sizes of cartridges loaded on the projector in respective predetermined positions on the projector.

The illustrative projector depicted in FIG. 1 of the accompanying drawings is of the general type disclosed in the above-identified U.S. Pat. application Ser. No. 685,616 and will be seen to comprise a generally rectangular casing 11, including a housing 12 which extends laterally toward the right side of the projector and supports a forwardly facing projection lens assembly 13. Above housing 12, a rotatable film takeup reel spindle or shaft 14 extends beyond vertical wall member 15 and is adapted to receive any of several different diameter film takeup reels. The tallest of such reels is shown in solid lines at 16, with the peripheries of two progressively larger reels being indicated in broken lines at numerals 16a and 16b.

Figure 3:
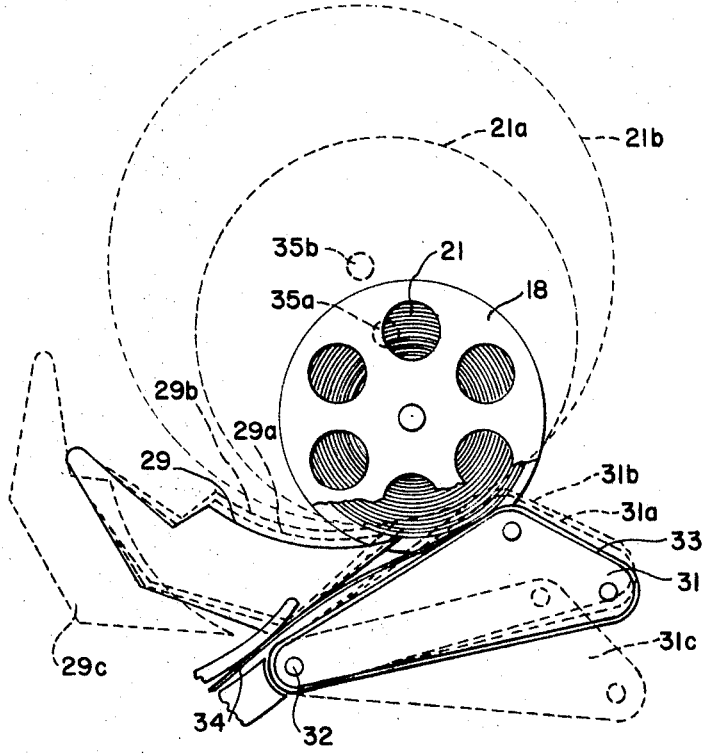
FIG. 3 is a schematic elevational view of a portion of the subject projector, depicting the relative operative locations the axes of film supply reels contained in the cartridges shown in FIG. 1 and further depicting the manner in which a film-stripping and -threading mechanism cooperates with the film rolls carried by such reels.

Forwardly of takeup reel spindle 14, a similar supply reel spindle 17 likewise extends beyond wall member 15 to support and impart rotational movement to a film supply reel 18 housed within a film supply cartridge 19 loaded onto the projector. As in the case of the film takeup reels, a small-capacity film cartridge 19 is shown loaded onto the projector in solid lines, with the outlines of two similar but progressively larger cartridges being shown respectively in broken lines at 19a and 19b in the loaded positions assumed by those cartridges. The film supply reels within the different-sized cartridges 19, 19a and 19b are of corresponding different diameters and therefore accommodate film supply rolls 21, 21a and 21b of progressively larger maximum diameters, as shown in FIG. 3.

Figure 2:
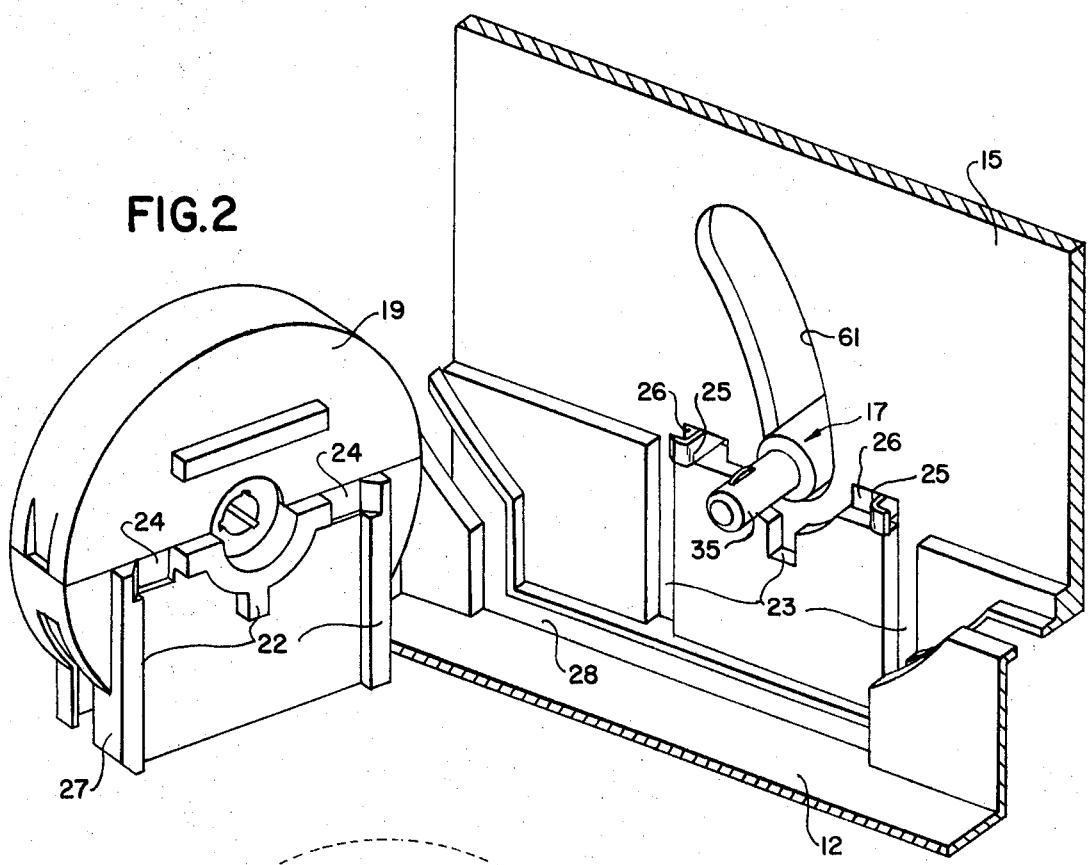
FIG. 2 is a perspective illustration of the film cartridge shown in solid lines in FIG. 1 and of the portion of the projector which selectively cooperates with the different sizes of cartridges to locate and support the cartridges in the respective predetermined positions shown in FIG. 1.

In accordance with the disclosures of copending U.S. Pat. applications Ser. No. 685,616 and 731,562, all of the film cartridges are provided with similar locating ribs 22, as illustrated on cartridge 19 in FIG. 2. These ribs are adapted to be received in mating positioning slots 23 defined by wall member 15 of the projector. Additionally, latch openings 24 are similarly located with reference to the locating ribs of each of the cartridges and are adapted to be engaged by releasable latch members 25 extending through openings 26 in the projector wall member 15, whereby a cartridge installed on the projector is releasably held in its operative position.

By reference to FIGS. 1 and 4, it will be apparent that the cooperation between the locating ribs on the different-sized cartridges and the mating positioning slots on the projector positions the three different-sized cartridges with their respective reel hub axes at predetermined different locations. As will be described later in detail, supply reel spindle 17 is adapted to be adjusted to these same predetermined different locations to rotatably support the film supply reel of whichever cartridge is mounted on the projector.

When cartridge 19 is latched in place on the projector, its slotted base portion 27 (FIG. 2) is aligned with slot 28 in the projector housing and with a stripping and threading mechanism comprising a stripper finger 29 and a stripper belt member 31. To initiate the film-stripping and -threading operation, the stripper finger moves from its inoperative position shown in broken lines at 29c in FIG. 3 to its operative position shown in solid lines in that figure, thereby locating the tip of the finger in engagement with the outermost convolution of the film supply roll 21 wound onto the reel. Concurrently, stripper belt member 31 rotates in a counterclockwise direction about support shaft 32 from its inoperative position shown in broken lines at 31c to its operative position shown in solid lines, thus engaging its peripheral stripper belt 33 with the outermost roll convolution. As a part of the same operation, an appropriate clutch mechanism is adjusted so that supply reel spindle 17 can rotate in an unwinding direction. The stripper belt is constantly driven in a counterclockwise direction and therefore rotates the film roll in an unwinding clockwise direction. Accordingly, the leading end of the film is separated from the roll by the stripper finger and is delivered out of the cartridge into a narrow guide path defined between a portion of the stripper belt and the adjacent edge of the stripper finger.

By reference to FIG. 3, it will be seen that the disposition of the three reel axes allows the stripper belt member to pivot about shaft 32 into contact with the periphery of any of the corresponding film supply rolls 21, 21a or 21b by assuming the respective positions of the belt member shown at 31, 31a and 31b. Similarly, by means of a support linkage of the general type described in U.S. Pat. application Ser. No. 685,616 the stripper finger is also movable to different operative positions indicated at 29, 29a and 29b so that it can cooperate with the respective film rolls 21, 21a and 21b and thereby deliver the leading end of the film out of the cartridge, as previously described, regardless which size cartridge is loaded onto the machine.

As the leading end of the film emerges beyond the path defined between the stripper belt and stripper finger, it enters the open end of a guide channel shown at 34 in FIG. 3 and is thereby directed through a film projection gate and into engagement with an appropriate pulldown claw or equivalent film-advancing mechanism. Beyond the film gate the leading end of the film passes along another guide channel leading into a pivotally supported threading arm 35 (FIG. 1) by which it is conducted into self-attaching engagement with the hub of the film takeup reel mounted on spindle 14. When the film-threading operation has been completed, the stripper finger and stripper belt member are returned to their respective inoperative positions shown respectively in broken lines at 29c and 31c in FIG. 3, whereupon the film is projected as it unwinds from the cartridge and winds onto the film takeup reel. The trailing end of the film is attached to the film supply reel hub, and therefore is drawn taut when all of the available film has been displayed. This occurrence initiates a rewinding operation by opening the film gate, disabling the film pulldown mechanism and imparting counterclockwise rewinding rotation to the film supply reel spindle 17 as the film takeup reel spindle 14 is allowed to rotate freely. Thus, the film is rewound entirely into the cartridge, whereupon the rewound cartridge can be removed from the projector. Further details of various mechanisms for performing the foregoing operations are disclosed in the previously cited U.S. patent applications, but are not required for purposes of understanding the present invention.

FIGS. 4 and 5 illustrate the spindle support structure by means of which the film supply reel spindle is adjustable manually to support the three different-sized film supply reels at the respective positions shown in FIG. 3. In accordance with this preferred embodiment of the invention, the supply reel spindle 17 comprises a chuck member 35 attached to the end of a horizontal spindle shaft 36 which is rotatably journaled in bushing members 37 and 38 supported by spindle support member 39. The spindle support member, in turn, is pivotally carried by shaft 41 extending between parallel sideplates 42 and 43 of support arm 44. These two sideplates are maintained in rigid parallel relation to each other by top web member 45 integral therewith and by a stiffening shaft 46 riveted between the two plates. A countershaft 47 extends between bushings 48 and 49 in the sideplates at the end of the arm member opposite the reel spindle and is rotatably supported in stationary journal blocks 51. Adjusting lever 52, which is formed integrally with sideplate 43 of the support arm, extends forwardly through slot 53 in the vertical front wall member 54 of housing 12 and thereby provides means for manually rotating the support arm about countershaft 47 to different angular positions.

A pulley 57 is affixed to spindle shaft 36 adjacent the inner end of bushing member 38 and is connected by drive belt 56 to a similar pulley 55 mounted on rotatable countershaft 47. Beyond bushing member 38, a flanged cam follower roller 58 is rotatably supported on the spindle shaft. A retaining collar 59 is attached to the end of spindle shaft 36 beyond cam follower roller 58, thereby maintaining the latter in its depicted position adjacent bushing member 38. Since collar member 59 and pulley 57 are axially immovable relative to the spindle shaft, the reel chuck member remains at all times in its depicted position, in which it extends through slot 61 in wall member 15 by a sufficient distance to support the reel within a cartridge loaded onto the projector. A pulley 62 attached to countershaft 47 is driven by an appropriate motor, not shown, thereby causing the supply reel spindle 17 to be rotated by belt 56. As previously mentioned, clutch means or the like, not shown, are also incorporated in this spindle drive system to effect different modes of rotation of the supply reel spindle during different phases of operation of the projector.

A vertical cam plate 63 is immovably supported in alignment with cam follower roller 58 by screws 64 threaded into stationary mounting studs 65. Along its front edge, this cam plate defines a cam surface 66 including three arcuate detent indentations 67, 67a and 67b in respective coaxial alignment with the required three positions of the supply reel spindle. The hub 68 of the cam follower roller is of the same radius as the detent indentations and is engaged with cam surface 66, which is straddled by the roller flanges 69. Drive belt 56 is made of rubber or a similar elastic material and therefore resiliently biases the cam follower roller against the cam surface, supplemented if necessary by a coil spring 71 stretched between the spindle support member and the support arm. Accordingly, when lever 52 is moved to the position shown in solid lines in FIG. 5, the supply reel chuck member 35 is maintained in the proper position to receive the hub of a reel provided in the smallest of the three film cartridges. Upon movement of lever 52 upwardly to its intermediate position shown in broken lines at 52a, cam follower roller 58 rides out of detent indentation 67 by stretching belt 56 and spring 71 and drops into detent indentation 67a to locate the supply reel chuck at the proper position to receive the reel hub of a middle-sized cartridge 19a, as shown at 35a in FIG. 3 and by reference to spindle shaft 36a in FIG. 5. Similarly, further upward movement of the lever to the position shown in broken lines at 52b locates the cam follower roller in the uppermost detent indentation 67b, thereby positioning the spindle shaft and the reel chuck member as shown at 35b and 36b so that the chuck member can receive and support hub of a maximum-sized cartridge 19b. From the foregoing, therefore, it will be apparent that chuck member 35 can be adjusted selectively to any of its three predetermined operative positions by manual movement of lever 52.

By reference to broken line 72 in FIG. 5, which illustrates the arcuate movement path of shaft 41 about the axis of countershaft 47, it will be seen that the three operative positions of the chuck member are not disposed along an arc defined by the pivot axis of the support arm. For example, depending on the configuration of surface 66, the operative positions may be disposed on straight line 73. However, if the mode of construction of a particular projector does make it practicable to locate the axes of the different cartridge reel hubs along an arc centered at the pivot axis of a pivotally mounted spindle support arm, a somewhat simpler embodiment of the invention can be employed as illustrated in FIG. 6. In such a construction spindle 17 is journaled directly to support arm 76, which is generally similar to the previously described support arm 44. Accordingly, the spindle remains in fixed parallel relation to the pivot axis of the support arm defined by countershaft 47 so that the different positions of the spindle are located along the arc represented by broken line 77, at equal radii from the pivot axis of the arm. Since the cam follower roller and the cam plate associated therewith are not required to adjust the spindle, they can be eliminated and replaced by other appropriate detent means, not shown, to establish predetermined detent positions of the adjusting lever 78 attached to the support arm. However, it will be apparent that a spindle support structure of the type illustrated in FIGS. 4 and 5 will be preferable in many instances due to the greater design flexibility afforded by avoiding the necessity of locating the different spindle positions along the same arc defined by the support arm pivot axis.

Figure 7:
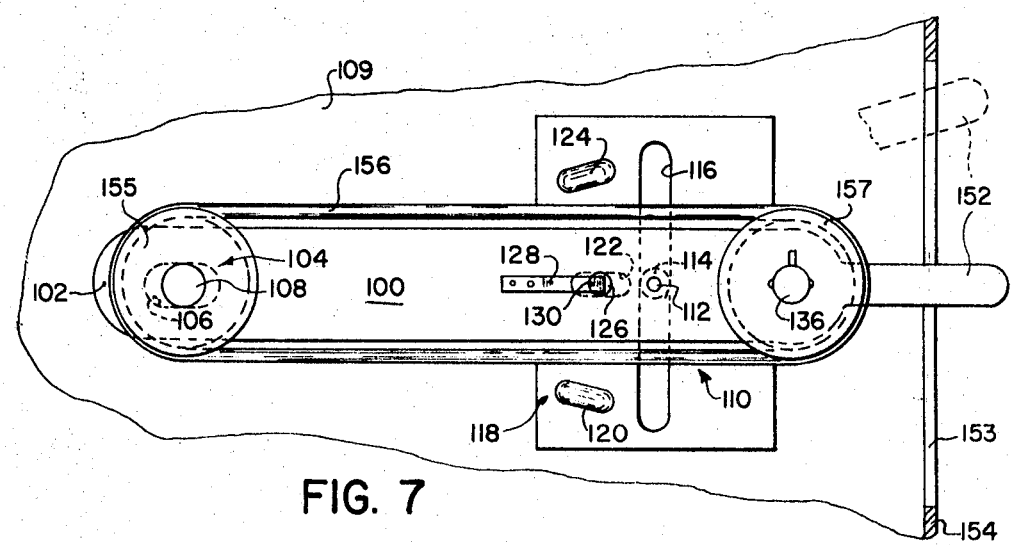
FIG. 7 is an elevational view of a third embodiment of the invention wherein the spindle support mechanism includes a movable pivot point permitting location of the spindle at different positions on a substantially straight line and further illustrating ball and detent means for holding the spindle at a selected one of its positions.
Figure 8:
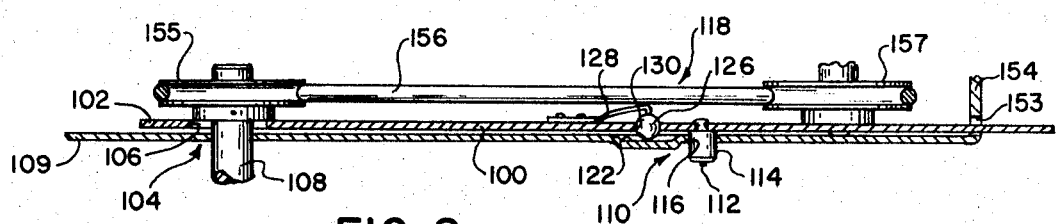
FIG. 8 is a plan view of the embodiment depicted in FIG. 7.

Referring now to FIGS. 7 and 8, a third embodiment of the invention is disclosed including additional or further means for effecting movement of the spindle between three operative positions not necessarily on the arc of a circle. Elements illustrated on FIGS. 7 and 8 which are the same as elements of FIGS. 4 and 5 have been given similar reference numerals preceded by a "1." Other elements have been given new reference numerals.

In this embodiment, the spindle support arm 100 is provided at one end 102 with an adjustable pivot means 104 comprising an elongated slot 106 in the end 102 and a pivot member or shaft 108 supported on the projector housing or support wall 109. Shaft 108 is mounted on the projector for rotation relative to the housing to drive spindle 136 in a manner previously described in connection with the embodiment illustrated in FIGS. 4 and 5. However, the shaft is not movable in lateral directions relative to the housing and thereby acts as a locating member about which the arm 100 can pivot as well as move longitudinally relative to elongated slot 106.

Operative positions of the spindle (in this case 3) are determined by a spindle-locating means 110 comprising a sleeve 114 rotatably carried by a projection or stud 112 fixed to and extending laterally from arm 100, and cam surfaces defined by a slot or recess 116 in a support wall 109 of the projector. The cam surface or slot 116 may have any number of shapes and configurations to guide the arm along a desired path including but not limited to the arc of a circle. For example, as illustrated in FIGS. 7 and 8, the guide slot 116 defines a linear path or straight line and is adapted to guide the spindle 136 between different positions lying along a linear path or straight line parallel to guide slot 116. Moreover, the projector may be provided with interchangeable plates 117 containing different guide slots 116 whereby the path defined by movement of spindle 136 can be varied as desired by interchanging such plates.

For holding the adjustable arm 100 at a selected one of its different angular positions, ball and detent means 118 are provided including in the embodiment illustrated three angularly spaced detents or recesses 120, 122, and 124 in support wall 109 and a ball 126 on arm 100. The ball is resiliently urged by leaf spring 128 to extend through an opening 130 in arm 100, but is prevented from passing entirely through the arm by the width of opening 30 which is less than the diameter of the ball 126. The width of the slot, however, is sufficient to permit engagement between the portion of the ball extending through the slot and wall 109 or a selected one of the detents in the wall. The detents 120—124 have inclined surfaces adjacent their edges and the ball can move up these inclined edges against the resilient force exerted by spring 128 to permit pivotal movement of arm 100 between the positions defined by detents 120, 122 and 124. When the arm is moved until it is again in a position corresponding to one of the detents, the ball will drop into the respective detent under the action of spring 128 and will hold or locate the arm at the detent until additional force is applied to the arm sufficient to again move the ball up the incline and out of the respective detent.

In operation, the spindle can be moved to and between its selected positions by adjusting lever 152. As the lever is moved upwardly the arm is guided along a straight line by stud 112 and sleeve 114 moving in slot 116. As the spindle moves in such straight line, arm 100 will pivot on shaft 108 and will also move longitudinally on the shaft to account for the greater distance between the spindle 136 and shaft 108. Upon reaching its uppermost position, shown in dotted lines in FIG. 7, ball 126 will fall into detent 124 to accurately hold or locate the arm and spindle in the upper position. In a similar manner, the spindle can be moved to various other positions, such as a lower position corresponding to detent 120.

Figure 9:
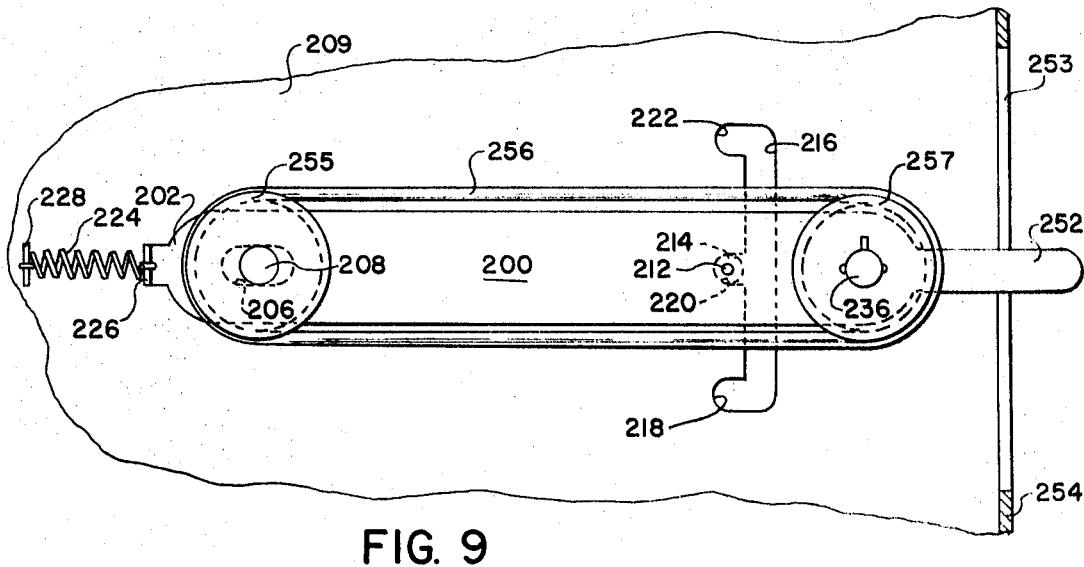
FIG. 9 is an elevational view of a fourth embodiment of the invention similar to the embodiment depicted in FIG. 7 but having a pin and notch means for holding the spindle at a selected one of its positions.

Referring now to FIG. 9, still another embodiment of the invention has been illustrated which is similar in many respects to the embodiment illustrated in FIGS. 7 and 8 and which has been provided with reference numerals in a series between 200 and 300 corresponding where there are corresponding parts to the numerals in FIGS. 7 and 8 between 100 and 200. In this embodiment, however, the spindle is located and held at a selected one of its operative positions by a stud carried in a notched slot instead of the ball and detent illustrated in FIGS. 7 and 8. In this embodiment the arm 200 includes a sleeve 214 rotatably held on a stud 212 fixed to arm 200 and extending downwardly into a cam means in the form of a slot or guide 216. Slot 216 includes in one wall thereof three recesses or notches 218, 220, and 222 having widths or diameters slightly larger than sleeve 214 such that the sleeve can freely move into or out of the notches. Moreover, the arm is urged to the left, as illustrated in FIG. 9, by a spring means 224 secured to a bent end portion 226 of arm 200 and a bent tab 228 on the support wall 209, to thereby urge the sleeve 214 of arm 200 into a selected one of the recesses 218—222.

In the operation of this embodiment, arm 200 and spindle 236 may be moved to the upper position corresponding to notch 222 by moving lever 252 to the right against the force of spring 224 until sleeve 214 clears notch 220, and then by moving the lever upwardly until the sleeve 214 is urged into notch 222 by the spring 224. In a similar manner the arm can be moved to a lowered position corresponding to notch 218.

While the above embodiments have been illustrated with an adjusting lever 52, 152 and 252, respectively, it should be understood that the adjusting lever may be eliminated completely and the spindle may be used in lieu thereof to move the arm between its operative positions.

The invention has been described in detail with particular reference to preferred embodiments thereof, but it will be understood that variations and modifications can be effected within the spirit and scope of the invention.

I claim:

1. A film reel support structure for use in a motion picture projector, said structure comprising:
    a support arm;
    pivotal support means supporting said support arm at one end thereof for angular pivotal movement about a fixed pivot axis;
    a spindle adapted to support a film reel;
    spindle bearing means rotatably supporting said spindle on said support arm in parallel relation to said pivot axis, said spindle bearing means being adjustable relative to said support arm to vary the distance between said spindle and said pivot axis;
    first adjusting means for selectively adjusting said support arm to predetermined angular positions by angular rotation of said arm about said pivot axis; and
    second adjusting means for adjusting said spindle bearing means relative to said support arm as a function of the angular adjustment of said support arm by said first adjusting means.

2. The structure defined by claim 1 in which said second adjusting means includes:
    a stationary cam member;
    a cam follower member carried by said spindle bearing means in fixed relation thereto; and
    resilient means for resiliently biasing said cam follower member into operative engagement with said stationary cam member.

3. The structure defined by claim 1 including:
    a rotatable shaft comprising said pivotal support means, said shaft being coaxial with said pivot axis;
    a first pulley carried by said rotatable shaft;
    a second pulley carried by said spindle; and
    an endless belt connecting said first and second pulleys to transmit rotation therebetween, said belt being sufficiently elastic to accommodate the variation in distance between said spindle and said pivot axis occasioned by said second adjusting means.

4. In a motion picture projector adapted to project film wound in supply rolls of different sizes on hubs, each such roll having a leading end and being contained within cartridges of different sizes; the combination comprising:
    a housing;
    a film-stripping mechanism on said housing movable from a first position to a second position for extracting the leading end of such a film roll from a cartridge;
    a support member pivotally mounted on said housing for movement to different angular positions; and
    a spindle rotatably mounted on said support member and adapted to engage the hub of such a supply roll contained within a cartridge, the position of said spindle being variable by movement of said support member to different angular positions for the selective mounting of cartridges of different sizes, whereby the periphery of any of the corresponding film supply rolls will be contacted by said film-stripping mechanism as said film-stripping mechanism is moved towards its second position.

5. In a motion picture projector adapted to project film wound in supply rolls of different sizes on hubs, each such roll having a leading end and being contained within cartridges of different sizes, the cartridges having base portions and sidewalls which define openings spaced from the base portions by amounts related to the size of the cartridge; the combination comprising:
    a housing;
    a film-stripping mechanism on said housing movable from a first position to a second position for extracting the leading end of such a film roll from a cartridge;
    a support member pivotally mounted on said housing for movement to different angular positions;
    a surface on said housing adapted to be engaged by the base portion of a received cartridge; and
    a spindle rotatably mounted on said support member and adapted to extend through the opening defined by the received cartridge's sidewall and to engage the hub of a supply roll contained within that cartridge, the position of said spindle being variable by movement of said support member to different angular positions for the selective mounting of cartridges of different sizes to vary the position of the spindle relative to said surface, whereby the periphery of any of the corresponding film supply rolls will be contacted by said film-stripping mechanism as said film-stripping mechanism is moved towards its second position.

6. A motion picture projector adapted to be loaded with different ones of a plurality of interchangeable film supply cartridges of predetermined different sizes which house supply reels of film having a leading end, such reels having different film-carrying capacities corresponding to the cartridge size, said projector comprising:
    locating means cooperable with mating means on said cartridges for establishing loaded positions of different-sized ones of said cartridges at which the respective film reels housed therein are rotatable about corresponding ones of a plurality of different mutually parallel predetermined reel axes;
    a film-stripping mechanism movable from a first position to a second position for extracting the leading end of such a film from a cartridge;
    a support arm pivotally supported for angular movement about a pivot axis, said pivot axis being parallel to said reel axes;
    a spindle carried by said support arm for rotation about an axis spaced from and parallel to said pivot axis;
    means for selectively adjusting the angular position of said arm by rotation of said arm about said pivot axis to thereby position said spindle in coaxial relation with any selected one of said reel axes; and means on said spindle for engaging and rotatably supporting the one of said reels within the one of said cartridges located in its loaded position with that reel in coaxial alignment with said spindle.

7. A motion picture projector according to claim 6 wherein said predetermined reel axes are disposed at different locations along an arc coaxial with said pivot axis of said arm, said spindle being carried by said support arm at a fixed distance from said pivot axis corresponding to the radius of said arc.

8. A motion picture projector according to claim 6 wherein at least two of said predetermined reel axes are at different distances from said pivot axis of said support arm, said projector further comprising:

means for supporting said spindle on said arm for movement relative to said pivot axis; and means for moving said spindle relative to said pivot axis as a function of the angular position of said support arm to thereby selectively align said spindle coaxially with different ones of said predetermined reel axes.